(12) United States Patent
Bahrenburg et al.

(10) Patent No.: US 6,959,010 B1
(45) Date of Patent: Oct. 25, 2005

(54) METHOD AND RADIO STATION FOR DATA TRANSMISSION

(75) Inventors: Stefan Bahrenburg, München (DE); Christoph Euscher, Rhede (DE); Tobias Weber, Otterbach (DE); Paul Walter Baier, Kaiserslautern (DE); Jürgen Mayer, Schifferstadt (DE); Johannes Schlee, Blaustein (DE)

(73) Assignee: Siemens Aktiengesellschaft, Munich (DE)

( * ) Notice: Subject to any disclaimer, the term of this patent is extended or adjusted under 35 U.S.C. 154(b) by 630 days.

(21) Appl. No.: 09/494,780

(22) Filed: Jan. 31, 2000

Related U.S. Application Data

(63) Continuation of application No. PCT/DE98/02026, filed on Jul. 20, 1998.

(30) Foreign Application Priority Data

Jul. 31, 1997 (DE) ................................ 197 33 120

(51) Int. Cl.$^7$ ............................................... H04J 3/06
(52) U.S. Cl. ........................ 370/503; 370/329; 370/208
(58) Field of Search ................................ 370/310, 328, 370/335, 336, 337, 338, 342, 345, 347, 441, 370/442, 458, 464, 465, 479, 498, 330, 536, 370/329, 503, 208, 280, 252; 375/130, 354, 375/200; 455/435; 380/44

(56) References Cited

U.S. PATENT DOCUMENTS

| | | | |
|---|---|---|---|
| 3,639,909 A * | 2/1972 | Hauck et al. ............. 340/172.5 |
| 5,142,534 A | 8/1992 | Simpson et al. ............. 370/330 |
| 5,283,811 A * | 2/1994 | Chennakeshu et al. ....... 375/14 |
| 5,428,608 A * | 6/1995 | Freeman et al. ........... 370/60.1 |
| 5,511,068 A * | 4/1996 | Sato .......................... 370/335 |
| 5,592,514 A * | 1/1997 | Mobin ........................ 375/336 |
| 5,838,718 A * | 11/1998 | Ichihashi .................... 375/202 |
| 5,905,962 A * | 5/1999 | Richardson ................. 455/522 |
| 5,970,060 A * | 10/1999 | Baier et al. ................. 370/342 |
| 5,995,499 A * | 11/1999 | Hottinen et al. ............ 370/337 |
| 6,031,827 A * | 2/2000 | Rikkinen et al. ........... 370/330 |
| 6,128,322 A * | 10/2000 | Rasanen et al. ............ 370/536 |
| 6,567,389 B1 * | 5/2003 | Honkasalo et al. ......... 370/342 |

FOREIGN PATENT DOCUMENTS

DE 19549148 A1 7/1997
EP 0 615 352 A1 9/1994

OTHER PUBLICATIONS

"A joint detection CDMA mobile radio system concept developed within COST 231", Peter Jung et al., IEEE, 1995, pp. 469-473.

* cited by examiner

*Primary Examiner*—John Pezzlo
(74) *Attorney, Agent, or Firm*—Laurence A. Greenberg; Werner H. Stemer; Ralph E. Locher

(57) ABSTRACT

In the novel method for data transmission via a radio interface in a radio communications system, at least two data channels are assigned to one connection. Each data channel can be distinguished by an individual spread code. In addition to data symbols, midambles with known symbols are transmitted in a data channel. The number of midambles being used for the connection is less than the number of data channels. The method is particularly suitable for use in TD/CDMA 3$^{rd}$ generation mobile radio networks.

15 Claims, 4 Drawing Sheets

METHOD AND RADIO STATION FOR DATA TRANSMISSION

CROSS-REFERENCE TO RELATED APPLICATION

This is a continuation of copending International Application PCT/DE98/02026, filed Jul. 20, 1998, which designated the United States.

BACKGROUND OF THE INVENTION

Field of the Invention

The invention lies in the communications field. More specifically, the invention relates to a method and a radio station for data transmission via a radio interface in a radio communications system, in particular a mobile radio network.

Messages (for example voice, video information or other data) are transmitted in radio communications systems via electromagnetic waves. The electromagnetic waves are in this case emitted at carrier frequencies which are in a frequency band provided for the respective system. In the case of GSM (Global System for Mobile Communications), the carrier frequencies are in the range around 900 MHz. Frequencies in the frequency band around approximately 2000 MHz are slated for future radio communications systems, for example the UMTS (Universal Mobile Telecommunication System) or other so-called $3^{rd}$ generation systems.

The emitted electromagnetic waves are attenuated owing to losses from reflection, refraction, and stray emission due to the earth's curvature and the like. This results in a reduction in the reception power which is available at the receiving radio station. The attenuation is location-dependent and, for mobile radio stations, is also time-dependent.

Between a transmitting and a receiving radio station, there is a radio interface via which data transmission takes place by means of electromagnetic waves. German published patent application DE 195 49 148 discloses a radio communications system which uses CDMA subscriber separation (CDMA=Code Division Multiple Access) and a radio interface also having time-division multiplex subscriber separation (TDMA=Time Division Multiple Access). A JD method (Joint Detection) is used at the receiving end, in order to use the knowledge of the spread codes of a plurality of subscribers to improve the detection of the transmission data. In this case, it is known that one connection can be assigned to at least two data channels via the radio interface, in which case each data channel can be distinguished by an individual spread code. It is known from the GSM mobile radio network for transmitted data to be transmitted as radio blocks (burst) with midambles (i.e., interblock sequences) having known symbols being transmitted within a radio block. These midambles may be used as training sequences for the adaptation of the radio station at the receiving end. The receiving radio station uses the midambles to make an estimate of the channel impulse responses for different transmission channels.

For such radio communications systems, the number of channel impulse responses which can be estimated jointly represents a capacity-limiting factor. Since the number of symbols in the midamble is finite and channel impulse response cannot be infinitely short, the number of channel impulse responses which can be estimated jointly is limited and, in consequence, so is the number of data channels which are transmitted jointly via the radio interface.

SUMMARY OF THE INVENTION

The object of the invention is to provide a method and a radio station for data transmission in a radio communications system which overcomes the above-noted deficiencies and disadvantages of the prior art devices and methods of this kind, and which improve the capacity utilization of the radio communications system.

With the above and other objects in view there is provided, in accordance with the invention, a method for data transmission via a radio interface in a radio communications system, which comprises the following steps:

assigning one connection via a radio interface a given number of at least two data channels, whereby the data channels can be distinguished by an individual spread code;

transmitting in a data channel data symbols and, in addition, midambles with known symbols; and wherein a number of midambles used for the connection is less than the given number of data channels.

In other words, the objects are satisfied in that, in the radio communications system, at least two data channels are assigned to one connection, in which case each data channel can be distinguished by an individual spread code. In addition to data symbols, midambles with known symbols are transmitted in a data channel, in which case a number of midambles are used for the connection, this number being less than the number of data channels for this connection.

The number of midambles is thus no longer rigidly linked to the number of data channels, as a result of which the capacity-limiting factor now affects only the number of connections, but not the number of data channels. This allows the capacity of the radio communications system to be utilized better. In this case, use is made of the fact that a transmission channel between a transmitting and a receiving radio station is the same for one connection, that is to say for all the data channels for this connection. Furthermore, there is no need to make an estimate of the channel impulse response, that is to say a channel estimation, for each data channel individually.

In accordance with an added feature of the invention, only one midamble is used for one connection. In consequence, only one channel estimation is made per connection, as a result of which the capacity-increasing effect is used to the maximum extent.

In accordance with an additional feature of the invention, the data symbols for the at least two data channels of a connection are superimposed in the transmitter itself. This means that the midamble is produced in the transmitter once for all the data channels, and the data symbols in the data channels are added up before being transmitted by means of radio-frequency waves, advantageously as digital signals. This obviates a considerable amount of complexity which would otherwise be required in order to process and to transmit the signals for the various data channels in parallel.

The data symbols are advantageously superimposed with the same weighting. In consequence, all the data channels for a connection or for the entire radio interface and its data symbols are dealt with in the same way. In accordance with a further advantageous refinement, data symbols in a first category are superimposed with a higher weighting than data symbols in a second category. This higher weighting results in the data symbols in the first category being transmitted with a greater signal energy per data symbol, and thus being received better at the receiver, that is to say they can also be detected with greater accuracy. The data symbols in the first category could be, for example, signaling information, which needs to be better protected than the voice information.

The weighting of the data symbols for the various connections advantageously takes account of the required signal energy per connection. Mobile stations which are located close to the base station thus require less signal energy than the connections to the other mobile stations. Such data symbol weighting reduces interference for adjacent radio cells.

It is within the context of the invention for the ratio of the mean power per symbol between the midamble and the data symbols to be variable. If the adjustment is made such that the same mean power level is used for the midamble and a data part comprising the data symbols, the transmitted signal for a connection is not subject to any power fluctuations. The adjustment may also be made such that the data symbols in the data channels have a higher mean power level per symbol, thus allowing the data symbols to be detected better.

It is furthermore advantageous to evaluate the midamble for channel estimation at the receiving end, with the length of an estimated impulse response being variable. If only a short channel impulse response is estimated, then a greater number of channel impulse responses, that is to say a greater number of connections, can be transmitted at the same time via the radio interface. On the other hand, the specific terrain conditions (for example, owing to the widely scattered signal propagation times, fjords and mountain ranges require long channel impulse responses) can be taken into account better by setting longer or shorter channel impulse responses.

In accordance with again an added feature of the invention, the midamble is evaluated for channel estimation at the receiving end, with the length of the midamble being variable. For simple terrain conditions, only short channel impulse responses may be estimated, as a result of which the data parts can be correspondingly lengthened. The data rate which can be transmitted is thus increased. If the channel conditions are particularly difficult, then the length of the midamble can be increased, at the expense of the data rate. It is thus also possible for the data channels to have different data rates. In consequence, there is no need to transmit only data channels at a single data rate via the radio interface. This provides a high level of flexibility for the design of the radio interface.

In accordance with again another feature of the invention, the radio interface also includes a TDMA component, so that a finite burst, comprising midambles and data symbols, is transmitted in one time slot. One strategy for assigning the connections to a time slot is based on the number of midambles to be estimated per time slot. This allows the capacity of the radio resources in the radio interface to be better utilized, since the number of midambles to be estimated, that is to say the number of connections, per time slot is maximized rather than the number of data channels per time slot.

With the above and other objects in view there is also provided, in accordance with the invention, a radio station for data transmission in a radio communications system via a radio interface, comprising:
a control device for assigning at least two data channel to a connection in a radio communications system;
   wherein each data channel can be distinguished by an individual spread code, and
   wherein data symbols and, in addition, midambles with known symbols are transmitted in a data channel;
a signal processor using a number of midambles for the connection, whereby the number of midambles is less than a number of data channels.

Other features which are considered as characteristic for the invention are set forth in the appended claims.

Although the invention is illustrated and described herein as embodied in a method and radio station for data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
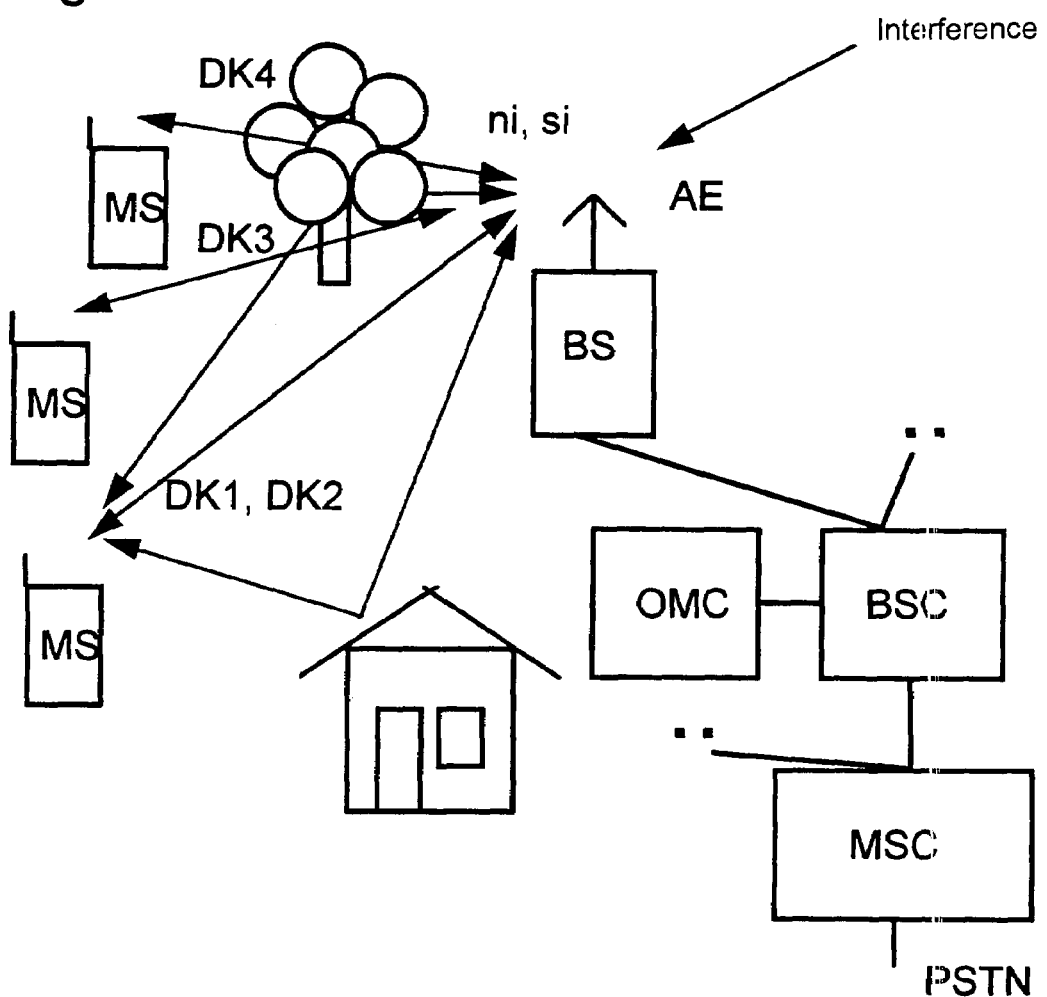
FIG. 1 is a schematic block diagram of a mobile radio network.

Referring now to the figures of the drawing in detail and first, particularly, to FIG. 1 thereof, there is seen a structural representation of a radio communications system corresponding to that of a known GSM mobile radio network. The system comprises a large number of mobile switching centers MSC, which are networked to one another and produce the access to a fixed network PSTN. Furthermore, these mobile switching centers MSC are connected to in each case at least one base station controller BSC. Each base station controller BSC in turn allows a connection to be set up to at least one base station BS. Such a base station BS is a radio station which can use a radio interface to set up a radio link to mobile stations MS.

By way of example, FIG. 1 shows three radio links for transmitting useful, i.e., wanted information ni and signaling information si between three mobile stations MS and one base station BS, with one mobile station MS being assigned to two data channels DK1 and DK2, and the other mobile stations MS each being assigned one data channel DK3 or DK4, respectively. An operation and maintenance center OMC provides monitoring and maintenance functions for the mobile radio network, or for parts of it. The functionality of this structure is used by the radio communications system according to the invention. It should be understood, however, that the concepts of the invention can also be transferred to and utilized in other radio communications systems.

The base station BS is connected to an antenna device which comprises, for example, three individual radiating elements. Each of the individual radiating elements transmits directionally into one sector of the radio cell which is supplied by the base station BS. However, alternatively, a greater number of individual radiating elements (as per adaptive antennas) may be used, so that it is also possible to use space subscriber separation based on an SDMA method (space division multiple access).

The base station BS provides the mobile stations MS with organization information relating to the location area (LA) and relating to the radio cell (radio cell identification). The organization information is transmitted at the same time via all the individual radiating elements of the antenna device.

The connections together with the wanted information ni and the signaling information si between the base station BS and the mobile stations MS are subject to multipath propagation, which is caused by reflections, for example buildings, in addition to the direct propagation path. Directional transmission from specific individual radiating elements in the antenna device AE results in a higher antenna gain than for omnidirectional transmission. Directional transmission improves the quality of the connections.

If it is assumed that the mobile stations MS are moving, then multipath propagation together with other interference sources leads to the signal components from the various propagation paths of a subscriber signal being superimposed as a function of time at the receiving mobile station MS. Furthermore, it is assumed that the subscriber signals of different base stations BS are superimposed at the reception location to form a received signal rx in one frequency channel. The function of a receiving mobile station MS is to detect data d, transmitted in the subscriber signals, relating to the wanted information ni, signaling information si and organization information data.

Figure 2:
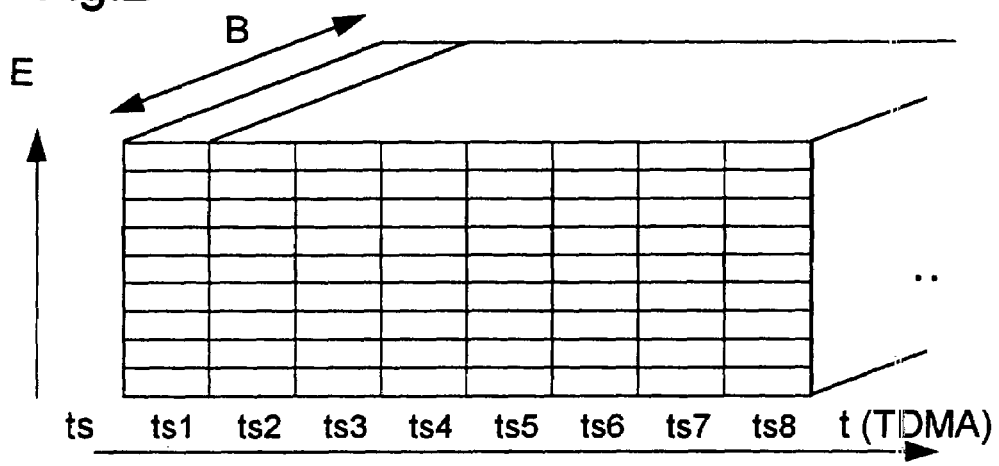
FIG. 2 is a schematic illustration of the frame structure of the radio interface.

Referring now to FIG. 2, there is shown the frame structure of the radio interface. Based on a TDMA component, a broadband frequency range, for example with a band width of B=1.6 (MHz, is split into a plurality of time slots ts, for example 8 time slots ts1 to ts8. Each time slot ts within the frequency range B forms a frequency channel. Information from a plurality of connections is transmitted in bursts within the frequency channels that are provided for wanted data transmission. Based on an FDMA (frequency division multiple access) component, a plurality of frequency ranges B are assigned to the radio communications system.

Figure 3:
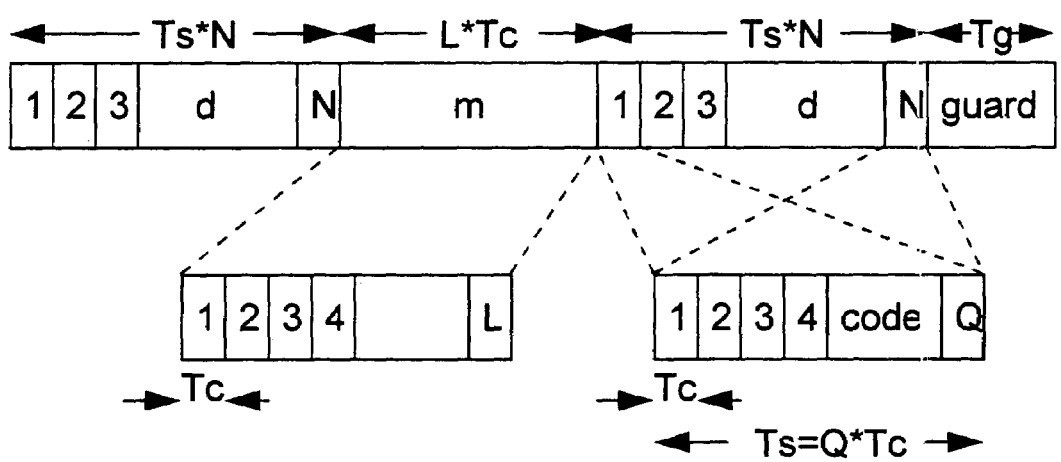
FIG. 3 is a schematic timing diagram of the formation of a burst.

Referring now to FIG. 3, the bursts for wanted data transmission comprise data parts with data symbols d, in which sections with midambles m are known at the receiving end are embedded. The midambles may also be referred to as interblock sequences. The data d are spread on a connection-specific basis using a fine structure, a spread code, so that, for example, K data channels DK1, DK2, DK3, . . . DKK can be separated by means of this CDMA component at the receiving end. Each of these data channels DK1, DK2, DK3, . . . DKK is assigned a specific energy E per symbol at the transmitting end.

The spreading of individual symbols in the data d with Q chips results in Q sub-sections of duration Tc being transmitted within the symbol duration Ts. The Q chips in this case form the individual spread code. The midamble m comprises L chips, likewise of duration Tc. Furthermore, the time slot ts includes a guard time of duration Tg in order to compensate for different signal propagation times for connections in successive time slots ts.

Within a broad band frequency range B, the successive time slots ts are broken down on the basis of a frame structure. Eight time slots ts are thus combined for one frame, with one specific time slot in the frame forming a frequency channel for wanted data transmission, and being used repeatedly by a group of connections. Further frequency channels, for example for frequency or time synchronization of the mobile stations MS are not inserted into each frame, but are inserted at predetermined times within a multiframe. The intervals between these frequency channels govern the capacity which the radio communications system has available for this purpose.

The radio interface parameters are, for example, as follows:

Duration of a burst . . . 577 $\mu$s
Number of chips per midamble m . . . 243
Guard time Tg . . . 32 $\mu$s
Data symbols per data part N . . . 33
Symbol duration Ts . . . 6.46 $\mu$s
Chips per symbol Q . . . 14
Chip duration Tc . . . 6/13 $\mu$s The parameters may also be set differently in the uplink (MS→BS) and downlink (BS→MS) directions.

Figure 4:
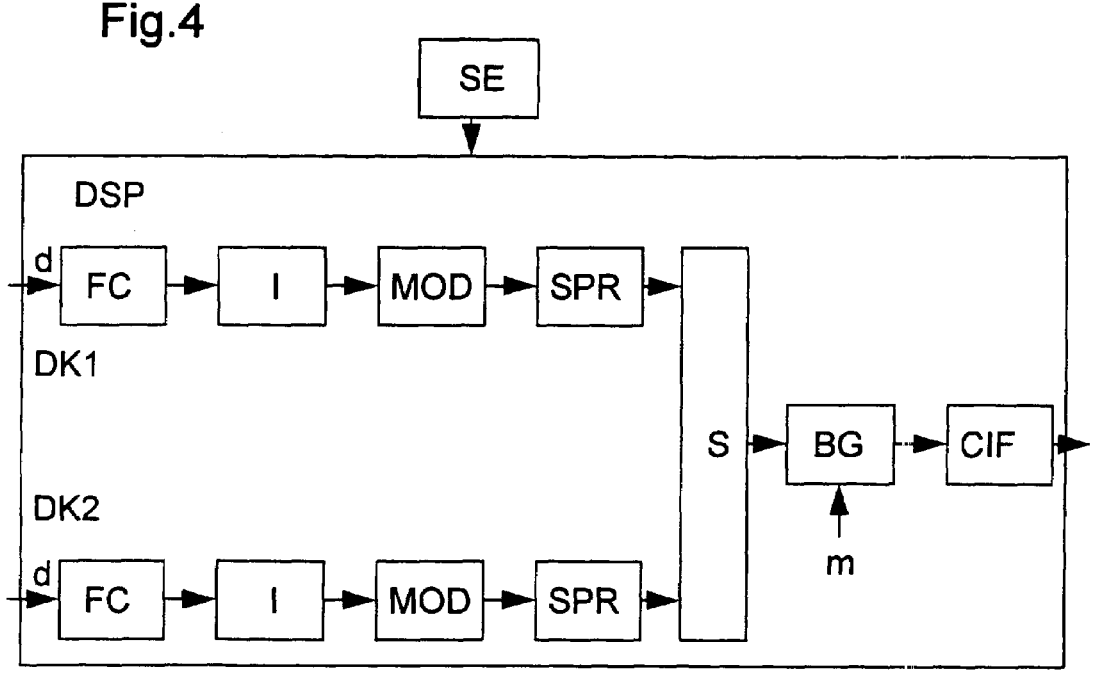
FIG. 4 is a block diagram of the receiver of a radio station.
Figure 5:
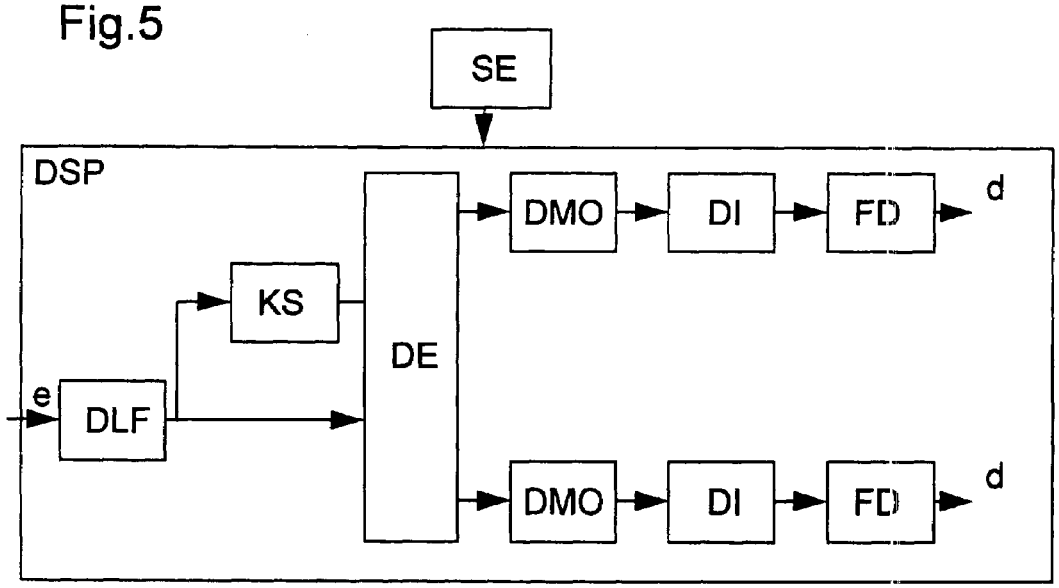
FIG. 5 is a block diagram of the transmitter of a radio station.

The transmitters and receivers shown in FIG. 4 and FIG. 5, respectively, relate to radio stations which may be either a base station BS or a mobile station MS. However, only the signal processes for one connection is shown.

The transmitter shown in FIG. 4 receives the previously digitized data symbols d from a data source (microphone or connection on the network side), with the two data parts being processed separately and each having N=33 data symbols d.

Channel coding is carried out first of all, at a rate 1/2 and with a constraint length 5 in a convolution encoder FC, which is followed by scrambling in an interleaver I, with a scrambling depth of 4 or 16.

The scrambled data are then 4-PSK modulated in a modulator MOD, are converted into 4-PSK symbols and are then spread in spreading means SPR using appropriate individual spread codes. This processing is carried out in a data processing means DSP in parallel for all the data channels DK1, DK2 for one connection. The illustration does not show that the other connections are likewise processed in parallel in a base station BS. The data processing may be carried out by a digital signal processor, which is controlled by a control device SE.

The spread data for the data channels DK1 and DK2 are superimposed in an adder S, with the data channels DK1 and DK2 being given the same weighting for this superimposition. The discrete-time representation of the transmitted signal s for m-th subscriber may be produced using the following equation, $$S_{q+(n-1)Q}^{(m)} = \sum_{k=1}^{K(m)} d_n^{(k,m)} c_q^{(k,m)}, \text{ where } q = 1 \ldots Q, n = 1 \ldots N$$

In this case, K(m) is the number of data channels for the $m^{th}$ subscriber, and N is the number of data symbols d per data part. The superimposed subscriber signal is supplied to a burst former BG which assembles the burst, taking account of the connection-specific midambles m.

Since complex CDMA codes are used, which are derived from binary CDMA codes by multiplication by $j^{q-1}$, the output signal of a chip impulse filter CIF which follows the burst former BG is GMSK-modulated and has an approximately constant envelope if the connection uses only one data channel. The chip impulse filter CIF carries out convolution, using a GMSK main impulse.

After digital signal processing, digital/analog conversion, conversion to the transmission frequency band and amplification of the signal are carried out at the transmitting end. The transmitted signal is then transmitted via the antenna device and, possibly via different transmission channels, reaches the receiving radio station, for example a mobile station MS.

One individual midamble m comprising L complex chips is in this case used per connection. The M different midambles required are derived from a basic midamble code of length M*W, where M is a maximum number of subscribers (connections) and W is the expected maximum number of values for the channel impulse response h. The connection-specific midamble m is derived by rotation to the right of the basic midamble code through W*m chips and by periodic expansion up to L>(M+1)*W−1 chips. Since the complex basic midamble code is derived from a binary midamble code by modulation with $j^{q-1}$, the transmitted signal for the midamble m is likewise GMSK-modulated.

Analog processing at the receiving end, that is to say amplification, filtering, and conversion to baseband, is followed by digital low-pass filtering of the received signals e in a digital low-pass filter DLF. A part of the received signal e, which is represented by a vector em of length L=M*W and does not include any interference in the data part, is passed to a channel estimator KS. The channel estimation of all M channel impulse responses h is carried out using $$h = IDFT(DFT(em)g)$$

where $$g = (DFT(sm))^{-1}.$$

The data estimation in the joint detection data estimator DE is carried out jointly for all of the connections. The spread codes are represented by $c^{(k)}$, the received data $d^{(k)}$, and the corresponding channel impulse responses by $h^{(k)}$, where k=1 to K.

The part of the received signal which is used for the data estimation is described by the vector $$e = A \cdot d + n$$

where A is the system matrix with the a-priori of known CDMA codes $c^{(k)}$ and the estimated channel impulse responses $h^{(k)}$. The vector d is a combination of the data $d^{(k)}$ for each data channel based on the following equation:

$$d = [d_1^{(1)}, d_1^{(2)}, \ldots d_l^{(k)} \ldots d_N^{(1)} \ldots d_N^{(K)}]$$

For this symbol arrangement, the system matrix A has a band structure, which is used to reduce the complexity of the algorithm. The vector n includes the noise element. The data estimation is carried out by means of a zero forcing block linear equalizer (ZF-BLE) using the following equation:

$$d = (A^{*T}A)^{-1} A^{*T} e.$$

The components have a continuous value and are non-manipulated estimated values of the data symbols d. In order to simplify the calculation of d, the problem can be rewritten as a linear equation system in the form $$(A^{*T}A)d = A^{*T}e$$

where, based on a Cholesky breakdown, $$A^{*T}A = H^{*T}H$$

the determination of the data symbols d is reduced to solution of the following two systems of linear equations $$H^{*T}z = A^{*T}e \text{ with } H \cdot d = z.$$

These equation systems may be solved recursively. H is an upper triangular matrix and $H^{*T}$ is a lower triangular matrix.

The data estimation described here is applicable to one individual data part. Furthermore, it is necessary to consider the interference between the midamble m and the data parts for the data estimation. After the separation of the data symbols in the data channels DK1 and DK2, demodulation is carried out in a demodulator DMO, unscrambling in a deinterleaver DI, and channel decoding in a convolution decoder FD.

At both the transmitting and receiving ends, the digital signal processing is controlled by a control device SE. The control device SE takes account, in particular, of the number of data channels DK1, DK2 per connection, the spread codes of the data channels DK1, DK2, the actual burst structure, and the requirements for channel estimation.

In particular, the control device SE influences the superimposition of the data symbols d in the adder S. This allows the data symbols in the various data channels DK1, DK2 to be kept in different weightings. Apart from equal weighting, data symbols d in a first category (for example signaling information) may also be given higher weightings. The control device SE likewise controls the burst former BG, and thus sets the energy per symbol. The energy per symbol is in this case the same in the data parts and in the midamble m. In certain traffic conditions, the data parts may also be given a higher weighting.

Figure 6:
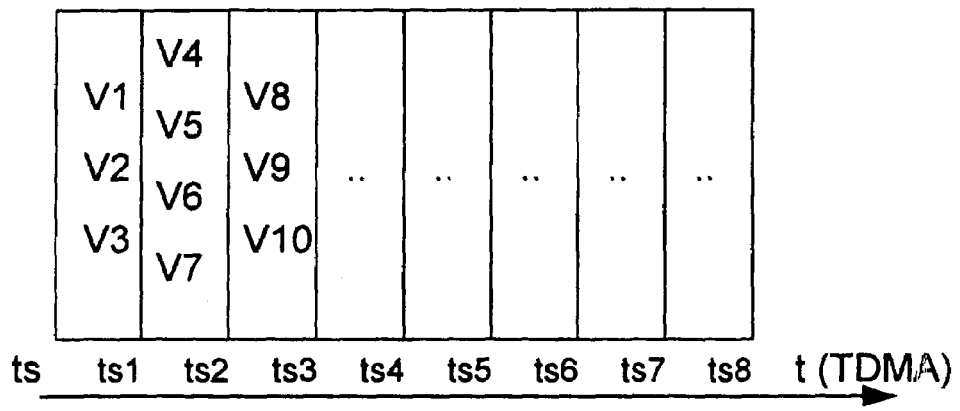
FIG. 6 is a schematic illustration of a strategy for assigning connections to time slots.

Referring now to FIG. 6, there is shown one frame of the TDMA structure of the radio interface. The assignment of the connections V1 to V10 to individual time slots ts1, ts2, ts3 is carried out on the network side. In this case, it is necessary to remember that only a limited number of channel impulse responses h can be estimated jointly per time slot ts. This limitation results from the fact that the channel impulse responses contain L chips, the channel impulse responses have W coefficients for accurate channel estimation, and M represents the number of connections per time slot. The number of channel impulse types which can be estimated jointly is in this case limited by the inequality L>M*W+W−1.

The assignment strategy thus provides for approximately the same number of connections to be transmitted in each time slot ts. From a second point of view, it is possible to take account of the number of data channels per connection, so that, for example, a greater number of connections are transmitted in the time slot ts2, in which the connections V4 to V7 have fewer data channels per connection.

By using a common midamble m for a number of data channels DK1 and DK2, it is possible to transmit a greater number of data channels DK1 and DK2 in one time slot ts. This leads to an increase in the data rate per time slot ts, or to lengthening of the channel impulse responses h (for complex terrain structures) which can be estimated in this time slot ts.

Figure 7:
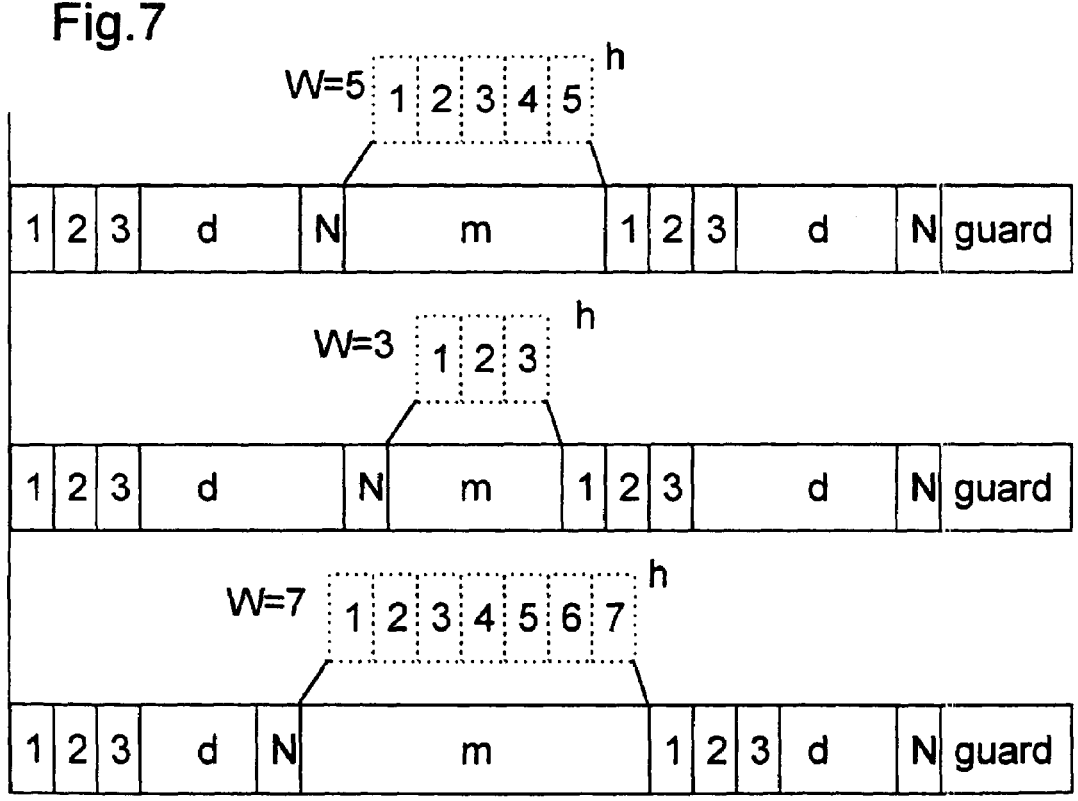
FIG. 7 is a schematic timing diagram of different bursts.

Referring now to FIG. 7, there is shown a further influence on the data rate. This is not based on the assumption of a constant burst structure, but allows the control device SE to change the burst structure. The length of the midamble m can be matched to the terrain conditions. In the case of complicated terrain conditions, for example in mountain ranges, or in fjords, the length of the midamble m is lengthened at the expense of the data parts. In simple terrains, for example on flat land, the midamble m can be shortened. The burst structure is advantageously defined on the basis of radio cells. However, it is also possible to vary the midamble length individually from one connection to another, in which case connections V1, V2, V3 of one burst structure are then advantageously assigned to a common time slot ts1.

The length of the midamble m in this case corresponds approximately to the length of the channel impulse response h to be estimated, that is to say the channel impulse response is short, for example, W=3, for simple terrain structures, and is long, for example W=7, for complicated terrain conditions.

The mobile radio network described in the exemplary embodiments and using a combination of FDMA, TDMA and CDMA is suitable for $3^{rd}$ generation system requirements. In particular, it is suitable for implementation in existing GSM mobile radio networks, where only a minor amount of modification is required. The design of dual-mode mobile stations MS, which operate both in accordance with the GSM Standard and in accordance with the proposed TD/CDMA Standard, is simplified.

The increase in the data rates per time slot by using common midambles (channel pooling) makes it possible to set variable data rates step-by-step of, for example, K times 13 kbit/s.

We claim:

1. A method for data transmission via a radio interface in a radio communications system, which comprises the following steps:
   - assigning one connection via a radio interface a given number of at least two data channels, whereby the data channels can be distinguished by an individual spreading code;
   - transmitting in the data channels data symbols and, in addition, training sequences with known symbols; and
   - utilizing for at least two of the data channels of the connection one common training sequence different from training sequences of other connections.

2. The method according to claim 1, which comprises using one common training sequence for all of the data channels of the connection.

3. The method according to claim 1, which comprises superimposing the data symbols for the at least two data channels of a connection in the transmitter.

4. The method according to claim 3, which comprises superimposing the data symbols with equal weighting.

5. The method according to claim 3, which comprises superimposing the data symbols in a first category with a higher weighting than the data symbols in a second category.

6. The method according to claim 1, wherein a ratio of a mean power per symbol between the training sequences and the data symbols is variable.

7. The method according to claim 1, which comprises evaluating the training sequences for channel estimation at a receiving end, with a length of an estimated channel impulse response being variable.

8. The method according to claim 1, which comprises evaluating the training sequences for channel estimation at a receiving end, with a length of the training sequences being variable.

9. The method according to claim 1, wherein the data channels have different data rates.

10. The method according to claim 1, wherein the radio interface includes a TDMA component, so that a finite burst comprising the training sequences and data symbols is transmitted in a respective time slot, and which further comprises basing an assignment strategy for connections to a time slot on a number of training sequences to be estimated per time slot.

11. A radio station for data transmission in a radio communications system via a radio interface, comprising:
   - a control device for assigning at least two data channels to a connection in a radio communications system;
   - wherein each data channel can be distinguished by an individual spreading code, and
   - wherein data symbols and, in addition, training sequences with known symbols are transmitted in a data channel;
   - a signal processor using for at least two of the data channels of the connection one common training sequence different from training sequences of other connections.

12. The method according to claim 1, wherein the training sequence is a midamble.

13. The radio station according to claim 11, wherein at least one of said training sequences is a midamble.

14. The method according to claim 1, wherein the code is an individual direct sequence spreading code.

15. The radio station according to claim 11, wherein the code is an individual direct sequence spreading code.

* * * * *